(12) United States Patent
Maki et al.

(10) Patent No.: US 8,369,002 B2
(45) Date of Patent: Feb. 5, 2013

(54) TERAHERTZ WAVE GENERATING METHOD AND APPARATUS

(75) Inventors: Ken-ichiro Maki, Saitama (JP); Chiko Otani, Saitama (JP)

(73) Assignee: Riken, Saitama (JP)

( * ) Notice: Subject to any disclaimer, the term of this patent is extended or adjusted under 35 U.S.C. 154(b) by 263 days.

(21) Appl. No.: 12/989,382

(22) PCT Filed: Apr. 21, 2009

(86) PCT No.: PCT/JP2009/057913
§ 371 (c)(1),
(2), (4) Date: Oct. 22, 2010

(87) PCT Pub. No.: WO2009/131117
PCT Pub. Date: Oct. 29, 2009

(65) Prior Publication Data
US 2011/0038032 A1    Feb. 17, 2011

(30) Foreign Application Priority Data

Apr. 25, 2008  (JP) ................................ 2008-115149

(51) Int. Cl.
G02F 2/02    (2006.01)
H01S 3/10    (2006.01)

(52) U.S. Cl. ........................................ 359/326; 372/22

(58) Field of Classification Search .......... 359/326–332; 372/21–22
See application file for complete search history.

(56) References Cited

U.S. PATENT DOCUMENTS 7,601,977 B2 * 10/2009 Yeh et al. ................... 250/504 R
8,121,157 B2 *  2/2012 Maki et al. ...................... 372/21

FOREIGN PATENT DOCUMENTS

| JP | 2002-223017 A | 8/2002 |
|---|---|---|
| JP | 2002-341392 A | 11/2002 |
| JP | 2003-015175 A | 1/2003 |
| JP | 2004-318029 A | 11/2004 |
| JP | 2005-195707 A | 7/2005 |
| JP | 2006-74021 A | 3/2006 |

OTHER PUBLICATIONS

International Search Report issued in corresponding Appln. No. PCT/JP2009/057913, completed May 18, 2009, mailed May 26, 2009.

Extended European Search Report completed on Oct. 18, 2011 and issued on Oct. 31, 2011 in corresponding European Application No. 09734351.1.

(Continued)

*Primary Examiner* — Daniel Petkovsek
(74) *Attorney, Agent, or Firm* — Griffin & Szipl, P.C.

(57) ABSTRACT

First and second laser beams are incident on a difference frequency mixing unit, and the two laser beams overlap in the difference frequency mixing unit, thereby generating a terahertz wave whose frequency is a frequency difference between the two laser beams. Each laser beam has a spatial spread in a frequency gradient direction, and a spatial frequency distribution of each laser beam is a distribution in which a magnitude of a frequency gradually increases in the frequency gradient direction. A frequency difference between the two laser beams is equal in each position in an overlapping region of the two laser beams. A terahertz wave of a single frequency is generated from this overlapping region. By spatially shifting the first laser beam and the second laser beam with respect to each other in the frequency gradient direction, the frequency difference in the overlapping region is changed, which changes the single frequency.

4 Claims, 10 Drawing Sheets

OTHER PUBLICATIONS

Maki K-I et al., "Terahertz beam steering and frequency tuning by using the spatial dispersion of ultrafast laser pulses", Optics Express Optical Society of America USA, vol. 16, No. 14, pp. 10158-10169, Jun. 23, 2008.

Brown, E R, et al., "Terahertz photomixing in low-temperature-grown GaAs", Proceedings of SPIE—The International Society for Optical Engineering—Advanced Technology MMW, Radio, and Terahertz Telescopes 1998 SPIE US, vol. 3357, pp. 132-142, 1998.

* cited by examiner

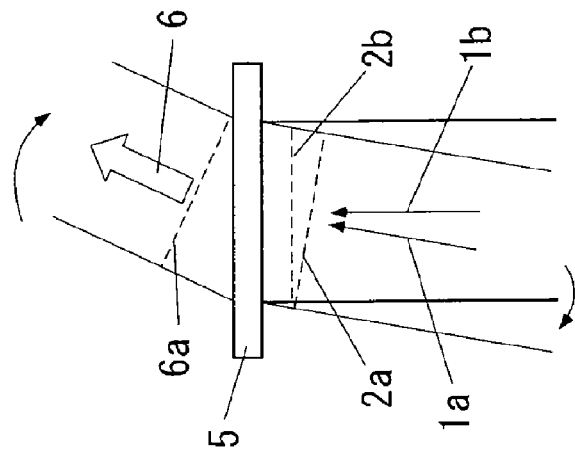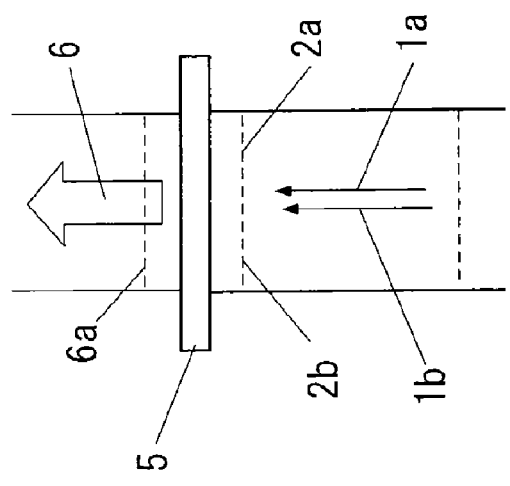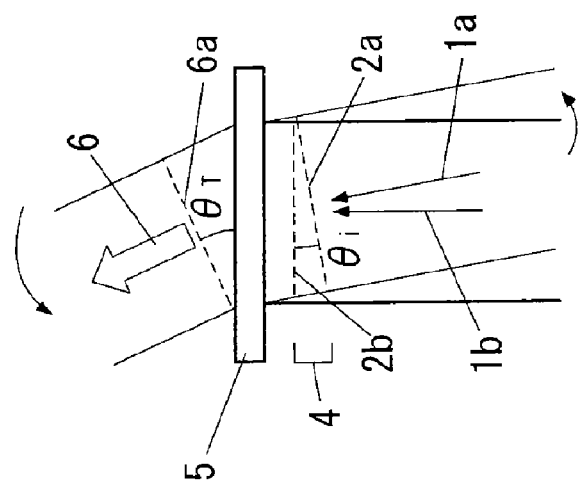

TERAHERTZ WAVE GENERATING METHOD AND APPARATUS

This is a National Phase Application in the United States of International Patent Application No. PCT/JP2009/057913 filed Apr. 21, 2009, which claims priority on Japanese Patent Application No. 2008-115149, filed Apr. 25, 2008. The entire disclosures of the above patent applications are hereby incorporated by reference.

BACKGROUND OF THE INVENTION

1. Technical Field of the Invention

The present invention relates to a terahertz wave generating method and apparatus that have a first laser beam and a second laser beam incident on a difference frequency mixing unit and overlap the two laser beams in the difference frequency mixing unit, thereby generating a terahertz wave whose frequency is a frequency difference between the two laser beams.

2. Description of the Related Art

Terahertz waves are electromagnetic waves that lie between radio waves and infrared radiation, and are 0.3 THz to 10 THz in frequency and 30 μm to 1 mm in wavelength. Such terahertz waves have penetrability to various substances including paper and plastics like radio waves, and also have a proper spatial resolution like light. In addition, terahertz waves have a unique absorption spectrum according to substance. Therefore, for example, such an application that identifies a type of a substance concealed in a parcel and the like and detects a dangerous article such as an explosive by spectrometry can be expected. To realize this, a terahertz wave generating apparatus that generates a terahertz wave at various frequencies is essential.

Conventionally, a technique of exciting a difference frequency mixing unit with laser light is widely employed for a terahertz wave generating apparatus suitable for spectrometry. This technique can mainly be classified into the following two types.

(Single Frequency Generation by Difference Frequency Mixing)

A terahertz wave of a single frequency is generated by a principle of difference frequency mixing, using two single-frequency laser beams that differ in frequency and wavelength (e.g. Patent Document 1 listed below). Moreover, the frequency of one of the laser beams is controlled to change the frequency difference, thereby changing the frequency of the terahertz wave.

(Broadband Generation by Femtosecond Laser)

There is a technique of generating a broadband terahertz wave pulse using a broadband femtosecond pulse laser (e.g. Patent Document 2 listed below).

[Patent Document 1] Japanese Patent Application Laid-Open No. 2002-341392

[Patent Document 2] Japanese Patent Application Laid-Open No. 2002-223017

In the above-mentioned "single frequency generation by difference frequency mixing", there is a problem that, when a laser beam wavelength is restricted, laser intensity and terahertz wave output decrease, too. There is also a problem of low stability because the frequency of the laser itself is controlled.

In the above-mentioned "broadband generation by femtosecond laser", a terahertz wave of various frequency components can be obtained at one time. However, since all frequency components are included in one pulse, the frequency components need to be divided by a Fourier transform in order to obtain spectroscopic information.

SUMMARY OF THE INVENTION

In view of this, an object of the present invention is to provide a terahertz wave generating method and apparatus that enable a frequency of a terahertz wave to be changed easily and stably without dividing frequency components.

To achieve the stated object, according to the present invention, there is provided a terahertz wave generating method that has a first laser beam and a second laser beam incident on a difference frequency mixing unit and overlaps the two laser beams in the difference frequency mixing unit, thereby generating a terahertz wave whose frequency is a frequency difference between the two laser beams, wherein the first laser beam has a spatial spread in a predetermined direction and a spatial frequency distribution of the first laser beam is a distribution in which a magnitude of a frequency gradually increases in a frequency gradient direction which is the predetermined direction, the second laser beam also has a spatial spread in the frequency gradient direction and a spatial frequency distribution of the second laser beam is also a distribution in which a magnitude of a frequency gradually increases in the frequency gradient direction so that the frequency difference between the two laser beams is equal in each position in an overlapping region of the two laser beams, and the terahertz wave of a single frequency is generated from the overlapping region, and wherein the first laser beam and the second laser beam are spatially shifted with respect to each other in the frequency gradient direction to change the frequency difference in the overlapping region, thereby changing the single frequency.

Moreover, to achieve the stated object, according to the present invention, there is provided a terahertz wave generating apparatus that generates, from a first laser beam and a second laser beam, a terahertz wave whose frequency is a frequency difference between the two laser beams, including:

a laser generation and guidance device; and a difference frequency mixing unit, wherein the laser generation and guidance device generates the first laser beam and the second laser beam, and guides the first laser beam and the second laser beam to the difference frequency mixing unit so as to overlap with each other, wherein the difference frequency mixing unit generates, in an overlapping region of the incident first laser beam and second laser beam, the terahertz wave whose frequency is the frequency difference between the two laser beams, wherein the first laser beam has a spatial spread in a predetermined direction and a spatial frequency distribution of the first laser beam is a distribution in which a magnitude of a frequency gradually increases in a frequency gradient direction which is the predetermined direction, the second laser beam also has a spatial spread in the frequency gradient direction and a spatial frequency distribution of the second laser beam is also a distribution in which a magnitude of a frequency gradually increases in the frequency gradient direction so that the frequency difference between the two laser beams is equal in each position in the overlapping region, and the terahertz wave of a single frequency is generated from the overlapping region, wherein the terahertz wave generating apparatus further includes a shift device that spatially shifts the first laser beam and the second laser beam with respect to each other in the frequency gradient direction, and wherein the frequency difference in the overlapping region is changed by the shifting, so that the single frequency is variable.

In the terahertz wave generating method and apparatus according to the present invention described above, the first laser beam has a spatial spread in a predetermined frequency gradient direction, and a spatial frequency distribution of the first laser beam is a distribution in which a magnitude of a frequency gradually increases in the frequency gradient direction. Likewise, the second laser beam has a spatial spread in the frequency gradient direction, and a spatial frequency distribution of the second laser beam is a distribution in which a magnitude of a frequency gradually increases in the frequency gradient direction. Accordingly, a frequency difference between the two laser beams is equal in each position in an overlapping region of the two laser beams. A terahertz wave of a single frequency is generated from this overlapping region. By spatially shifting the first laser beam and the second laser beam with respect to each other in the frequency gradient direction, the frequency difference in the overlapping region is changed, so that the single frequency is changed. This enables the frequency of the terahertz wave to be changed easily and stably without dividing frequency components.

According to a preferred embodiment of the present invention, the laser generation and guidance device includes:

a band laser generation unit that generates laser light having a predetermined frequency band;

a frequency gradient generation unit that has the laser light incident thereon, and generates a gradient laser beam having a spatial spread and also having the frequency distribution;

a beam separation unit that separates the gradient laser beam into the first laser beam and the second laser beam; and a guide optical unit that guides the first laser beam and the second laser beam to the difference frequency mixing unit.

Such a structure of the laser generation and guidance device makes it possible to generate the first laser beam and the second laser beam that have the above-mentioned frequency distribution in the frequency gradient direction.

According to a preferred embodiment of the present invention, the guide optical unit is disposed between the beam separation unit and the difference frequency mixing unit in an optical path, and has a reflection mirror for reflecting the second laser beam from the beam separation unit, wherein the shift device moves the reflection mirror, to change a position of incidence of the reflected second laser beam on the difference frequency mixing unit.

Thus, the shift device can change the position of incidence of the reflected second laser beam on the difference frequency mixing unit, by moving the reflection mirror.

According to the present invention described above, the frequency of the terahertz wave can be changed easily and stably without dividing frequency components.

BRIEF DESCRIPTION OF THE DRAWINGS

FIG. 9A is a diagram showing a scanning principle of a terahertz wave, and shows a situation where the terahertz wave is directed to the left.

FIG. 9B shows a situation where the terahertz wave is directed to the front.

FIG. 9C shows a situation where the terahertz wave is directed to the right.

DESCRIPTION OF THE PREFERRED EMBODIMENT

Figure 1:
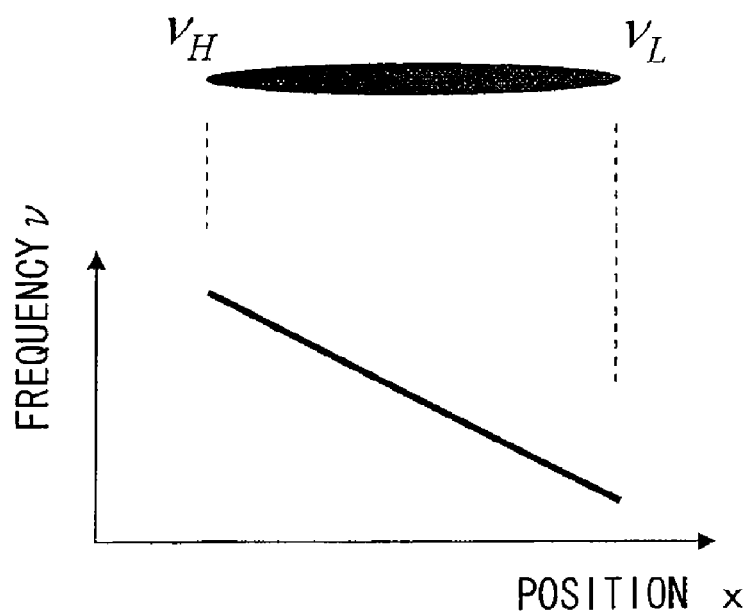
FIG. 1 shows a laser beam having a linear frequency distribution used in the present invention.

The following describes a best mode embodiment for carrying out the present invention, with reference to drawings. Note that common parts are given the same reference numerals in the drawings, and repeated description is omitted.

(Principle)

The present invention uses a first laser beam and a second laser beam that have a property shown in FIG. 1.

As shown in FIG. 1, each of the first laser beam and the second laser beam has a spatial spread in a frequency gradient direction (corresponding to the horizontal axis direction in FIG. 1), and a spatial frequency distribution of each of the first laser beam and the second laser beam is a linear distribution in which a magnitude of a frequency gradually increases in the frequency gradient direction. For example, a spatial shape of each of the first laser beam and the second laser beam may be an elliptical shape, and a long axis direction of the ellipse may correspond to the frequency gradient direction.

Figure 2A:
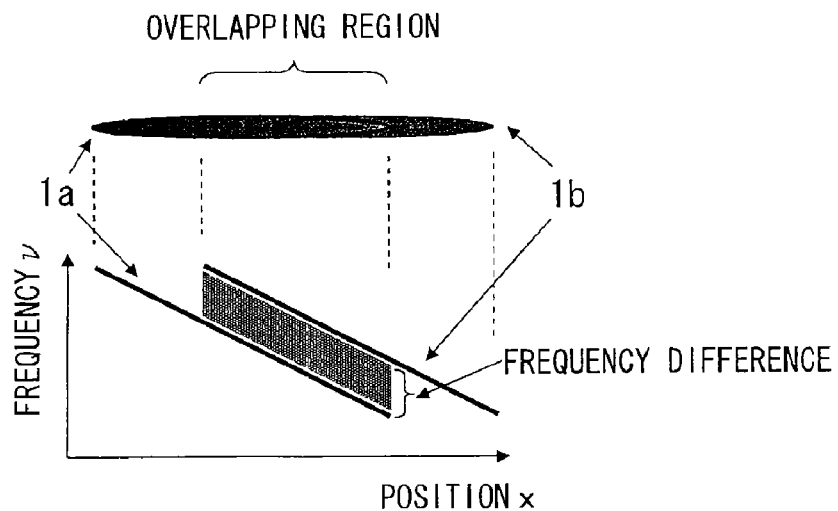
FIG. 2A is an explanatory diagram for generation of a terahertz wave of a single frequency using two laser beams that have the frequency distribution shown in FIG. 1.

When such first laser beam and second laser beam are overlapped with their frequency gradient directions being set in the same direction, a frequency difference between the two laser beams 1a and 1b is equal in each position in an overlapping region of the two laser beams 1a and 1b (see FIG. 2A). That is, in FIG. 2A, the first laser beam 1a and the second laser beam 1b overlap with each other, and their frequency difference is equal in each position (position x) in the overlapping region.

Figure 2B:
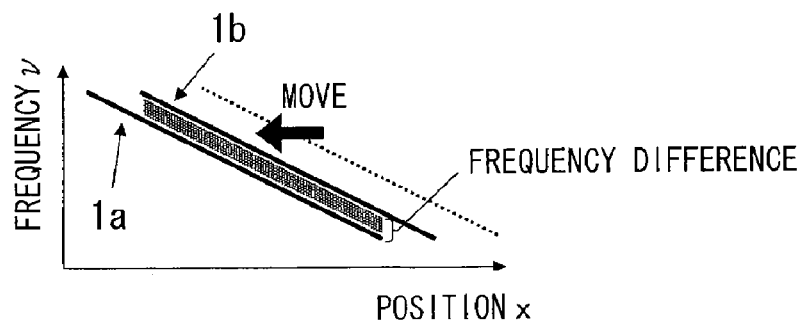
FIG. 2B shows a state where a laser beam is shifted from the state shown in FIG. 2A.
Figure 2C:
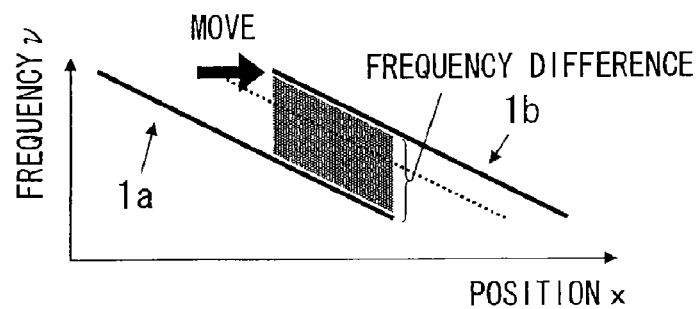
FIG. 2C shows another state where a laser beam is shifted from the state shown in FIG. 2A.

By spatially shifting the first laser beam and the second laser beam with respect to each other in the frequency gradient direction from the state shown in FIG. 2A, the frequency difference in the overlapping region is changed. For instance, when the second laser beam is shifted to the left from the state of FIG. 2A as shown in FIG. 2B, the frequency difference is decreased. When the second laser beam is shifted to the right from the state of FIG. 2A as shown in FIG. 2C, on the other hand, the frequency difference is increased.

By providing such an overlapping region inside a difference frequency mixing unit and changing the frequency difference as mentioned above, it is possible to generate a terahertz wave of a single frequency that is variable.

Figure 3:
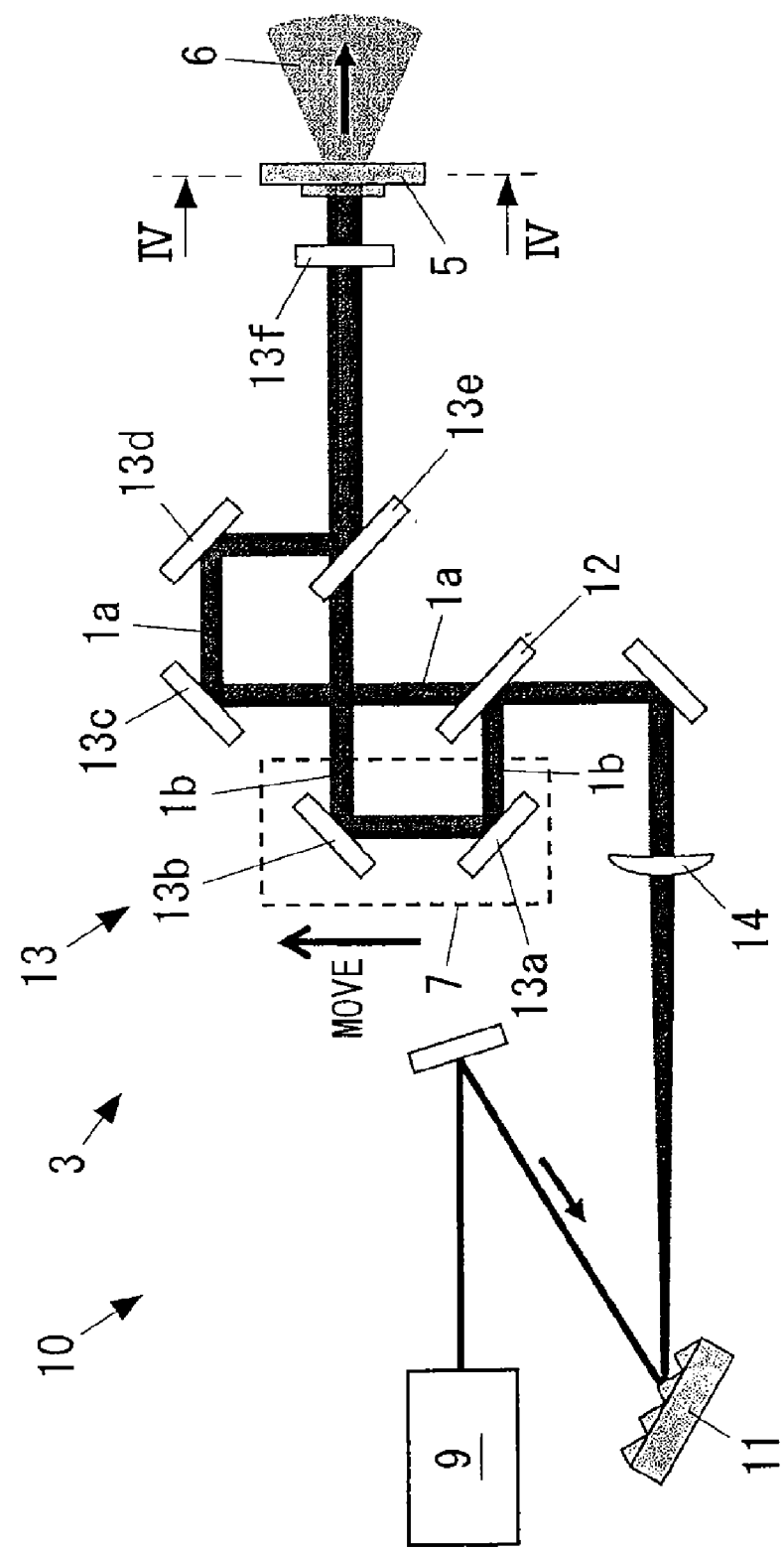
FIG. 3 is a diagram showing a structure of a terahertz wave generating apparatus according to an embodiment of the present invention.

FIG. 3 is a diagram showing a structure of a terahertz wave generating apparatus 10 according to an embodiment of the present invention. As shown in FIG. 3, the terahertz wave generating apparatus 10 includes a laser generation and guidance device 3, a difference frequency mixing unit 5, and a shift device 7.

The laser generation and guidance device 3 generates the above-mentioned first laser beam 1a and second laser beam 1b, and guides the first laser beam 1a and the second laser beam 1b to the difference frequency mixing unit 5 so as to overlap with each other. The difference frequency mixing unit 5 generates, in the overlapping region of the incident first laser beam 1a and second laser beam 1b, a terahertz wave 6 whose frequency is the frequency difference between the two laser beams 1a and 1b, by difference frequency mixing. The shift device 7 spatially shifts the first laser beam 1a and the second laser beam 1b with respect to each other in the frequency gradient direction.

According to this structure, it is possible to overlap the first laser beam 1a and the second laser beam 1b with their frequency gradient directions being set in the same direction, and spatially shift the two laser beams 1a and 1b with respect to each other in the frequency gradient direction. In this way, while ensuring that the frequency difference between the two laser beams 1a and 1b is equal in each position in the overlapping region, the frequency difference can be changed. Hence, when generating the terahertz wave 6 of a single frequency equal to the frequency difference, the single frequency can be changed.

The following describes the structure of the terahertz wave generating apparatus 10 in more detail.

The laser generation and guidance device 3 includes a band laser generation unit 9, a frequency gradient generation unit 11, a beam separation unit 12, and a guide optical unit 13.

The band laser generation unit 9 generates laser light having a predetermined frequency band. The band laser generation unit 9 is, for example, a femtosecond laser or other laser generation unit for generating laser light of a predetermined frequency band (preferably, broadband).

The frequency gradient generation unit 11 has the laser light from the band laser generation unit 9 incident thereon. The frequency gradient generation unit 11 may be a dispersive element such as a diffraction grating for generating a gradient laser beam from the incident laser light. The gradient laser beam has a spatial spread in the frequency gradient direction, and also has the above-mentioned frequency distribution.

The beam separation unit 12 separates the gradient laser beam into the first laser beam 1a and the second laser beam 1b. For example, the beam separation unit 12 is a beam splitter, and separates the gradient laser beam into the first laser beam 1a and the second laser beam 1b preferably at an intensity ratio of 1:1.

The guide optical unit 13 guides the first laser beam 1a and the second laser beam 1b separated by the beam separation unit 12, to the difference frequency mixing unit 5. In the example of FIG. 3, the guide optical unit 13 includes a first reflection mirror 13a and a second reflection mirror 13b for reflecting the second laser beam 1b separated by the beam separation unit 12, a third reflection mirror 13c and a fourth reflection mirror 13d for reflecting the first laser beam 1a separated by the beam separation unit 12, and a beam splitter 13e for guiding the second laser beam 1b reflected by the second reflection mirror 13b and the first laser beam 1a reflected by the fourth reflection mirror 13d to the difference frequency mixing unit 5 so as to couple the first laser beam 1a and the second laser beam 1b. Note that the guide optical unit 13 further includes a cylindrical lens 13f in the example of FIG. 3. According to this structure, the first laser beam 1a and the second laser beam 1b are guided to the difference frequency mixing unit 5 so as to overlap with each other in the difference frequency mixing unit 5.

Figure 4:
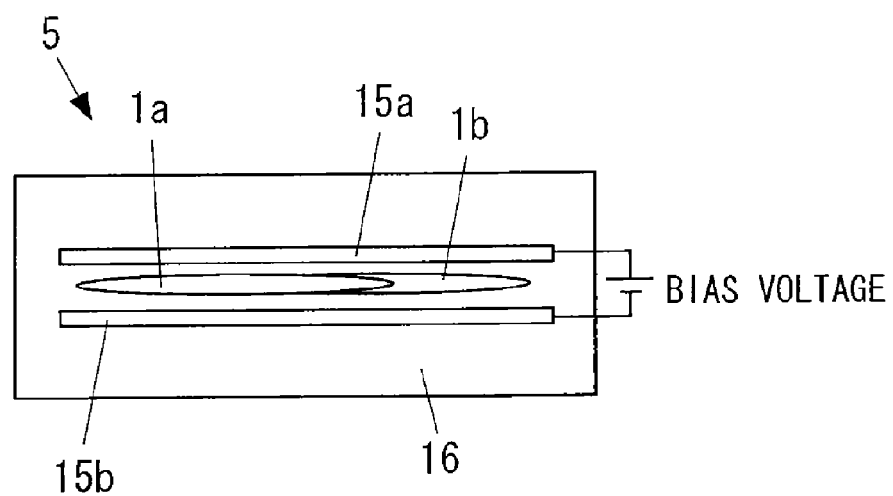
FIG. 4 is a sectional view taken along line IV-IV in FIG. 3, and shows a structure example of a difference frequency mixing unit.

The difference frequency mixing unit 5 generates, in the overlapping region of the incident first laser beam 1a and second laser beam 1b, the terahertz wave 6 whose frequency is the frequency difference between the two laser beams 1a and 1b. FIG. 4 is a sectional view taken along line IV-IV in FIG. 3, and shows a structure example of the difference frequency mixing unit 5. In the example of FIG. 4, the difference frequency mixing unit 5 is formed by attaching metal stripline electrodes 15a and 151b to a surface of a low-temperature-grown gallium arsenide (LT-GaAs) substrate 16, and is one type of nonlinear optical element called a photoconductive antenna. In a state where a voltage is applied between the electrodes 15a and 15b, the first laser beam 1a and the second laser beam 1b are irradiated between the electrodes 15a and 15b so as to overlap with each other. As a result, a carrier is generated, and a current flows from the electrode 15a to the electrode 15b in a whole laser beam irradiation region. Difference frequency mixing occurs from nonlinearlity of absorption during this time, thereby generating the terahertz wave 6 having a frequency that corresponds to the light frequency difference.

The shift device 7 moves the second reflection mirror 13b, to change a position of incidence of the reflected first laser beam 1b on the difference frequency mixing unit 5 in the frequency gradient direction. A direction in which the shift device 7 moves the second reflection mirror 13b is the same as or opposite to a direction in which the second laser beam 1b is incident on the second reflection mirror 13b. In this way, the position of the second laser beam 1b in the difference frequency mixing unit 5 is moved in a vertical direction in FIG. 3.

Preferably, the shift device 7 moves not only the second reflection mirror 13b but also the first reflection mirror 13a in the same direction by the same distance. This makes it possible to prevent an optical path difference between the second laser beam 1b and the first laser beam 1a. In detail, a first optical path of the first laser beam 1a from the beam separation unit 12 to the difference frequency mixing unit 5 and a second optical path of the second laser beam 1b from the beam separation unit 12 to the difference frequency mixing unit 5 are set at the same distance. This being the case, when the shift device 7 moves the second reflection mirror 13b and the first reflection mirror 13a in the same direction by the same distance, no difference occurs between the first optical path and the second optical path even though the first reflection mirror 13a and the second reflection mirror 13b are moved. Accordingly, even in the case where the first laser beam 1a and the second laser beam 1b are pulse lasers, a loss of the generated terahertz wave 6 can be prevented.

The shift device 7 may drive the first reflection mirror 13a and the second reflection mirror 13b by a servomotor, as an example.

Note that, in FIG. 3 (and in FIG. 8 described later), a beam collimator (e.g. a cylindrical lens) 14 converts the laser light traveling while spreading from the dispersive element 11 such as a diffraction grating, to parallel light.

In the embodiment of the present invention described above, the first laser beam 1a has a spatial spread in a predetermined frequency gradient direction, and a spatial frequency distribution of the first laser beam 1a is a distribution in which a magnitude of a frequency gradually increases in the frequency gradient direction. Likewise, the second laser beam 1b has a spatial spread in the frequency gradient direction, and a spatial frequency distribution of the second laser beam 1b is a distribution in which a magnitude of a frequency gradually increases in the frequency gradient direction. Accordingly, a frequency difference between the two laser beams 1a and 1b is equal in each position in an overlapping region of the two laser beams 1a and 1b. The terahertz wave 6 of a single frequency is generated from this overlapping region. By spatially shifting the first laser beam 1a and the second laser beam 1b with respect to each other in the frequency gradient direction, the frequency difference in the overlapping region is changed, so that the single frequency is changed. This enables the frequency of the terahertz wave 6 to be changed easily and stably without dividing frequency components.

The following describes an experimental result using the structure shown in FIG. 3.

Figure 5A:
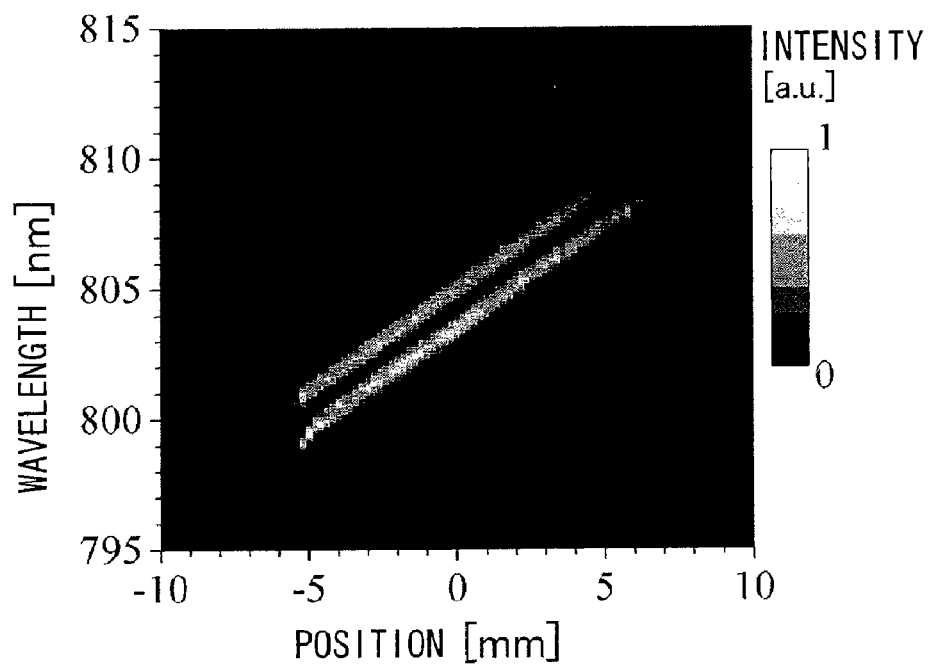
FIG. 5A is an experimental result for demonstrating a principle of the present invention, and shows a wavelength distribution.

FIG. 5A shows wavelength distributions of the above-mentioned first laser beam 1a and second laser beam 1b for generating the terahertz wave 6 having a single frequency of 0.7 THz. The first laser beam 1a has a wavelength component from 801 nm to 810 nm, and spreads in a spatial region of 12 mm in the above-mentioned frequency gradient direction. The second laser beam 1b has a wavelength component from 799 nm to 810 nm, and spreads in a spatial region of 14 mm in the above-mentioned frequency gradient direction. The laser beams 1a and 1b are both distributed approximately linearly. A size of a region where the two laser beams 1a and 1b overlap in the frequency gradient direction is 12 mm.

Figure 5B:
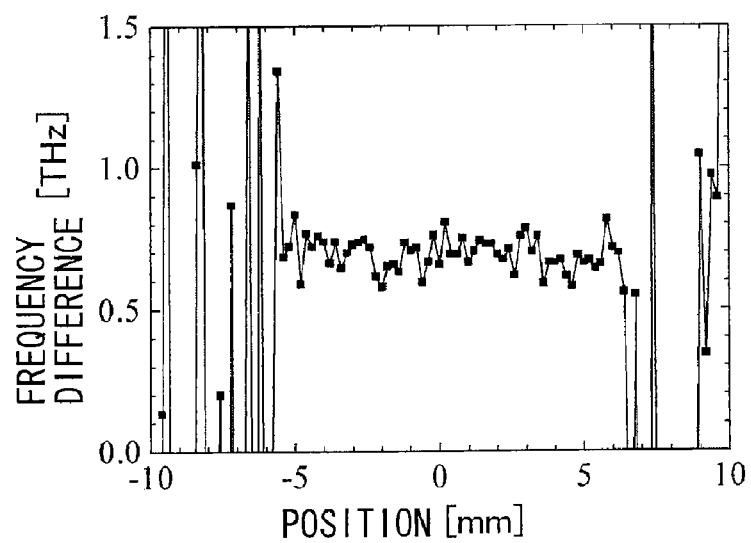
FIG. 5B is an experimental result for demonstrating the principle of the present invention, and shows a frequency difference distribution.

FIG. 5B shows a frequency difference distribution of the two laser beams 1a and 1b in the case of FIG. 5A. As shown in FIG. 5B, the frequency difference is 0.7 THz (about 1.5 nm in wavelength difference) in the whole overlapping region of the two laser beams 1a and 1b. This result is in agreement with the principle of the present invention described above.

Figure 6A:
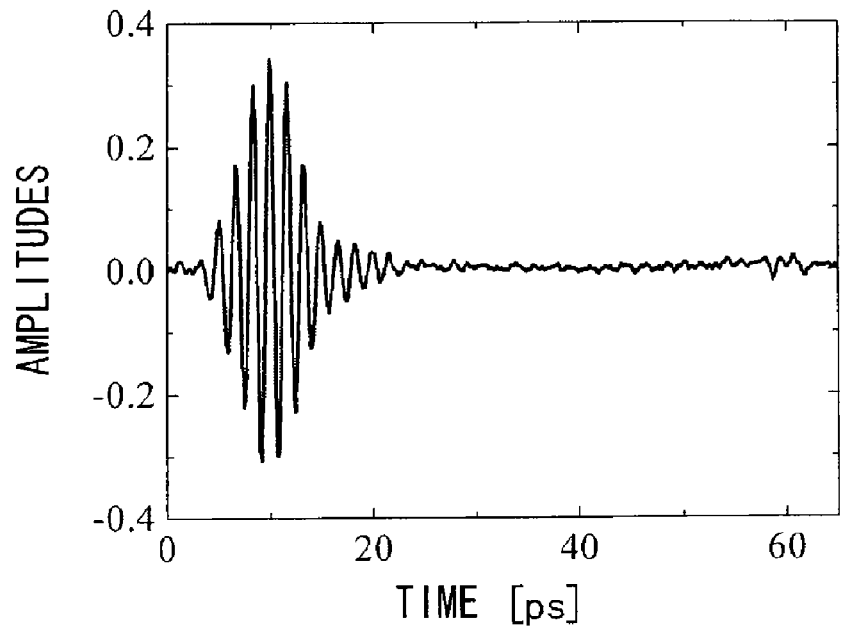
FIG. 6A shows a measurement result of a terahertz wave generated using the structure shown in FIG. 3.
Figure 6B:
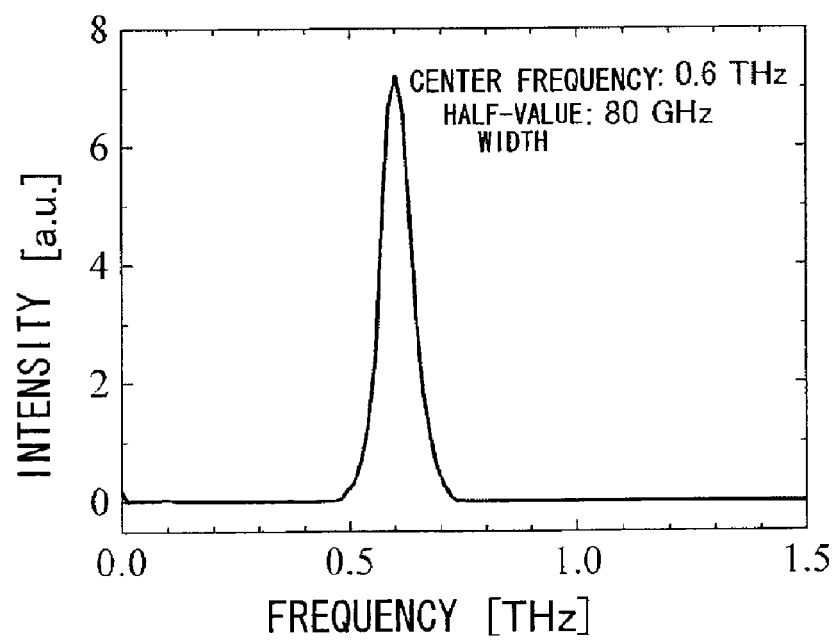
FIG. 6B shows a spectrum in FIG. 6A.

FIG. 6A shows a measurement result of the terahertz wave 6 generated using the structure shown in FIG. 3. FIG. 6A shows the case where the shift device 7 performs shifting so that the generated terahertz wave 6 has a frequency of 0.6 THz. A waveform of the terahertz wave 6 shown in FIG. 6A has such a pulse shape in which a fast vibration with a period of 1.6 ps is amplitude-modulated, and has an envelope width of 8 ps. FIG. 6B shows a spectrum of the terahertz wave 6 calculated based on this time waveform using a fast Fourier transform. As shown in FIG. 6B, a center frequency is 0.6 THz, and a linewidth is 80 GHz.

Figure 7A:
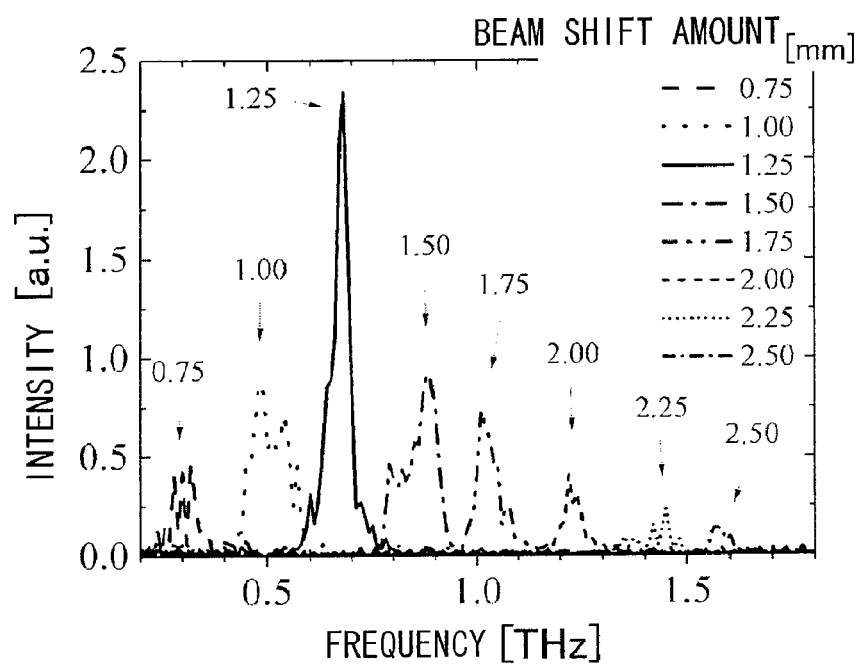
FIG. 7A shows a spectrum of the terahertz wave with respect to a beam shift amount.
Figure 7B:
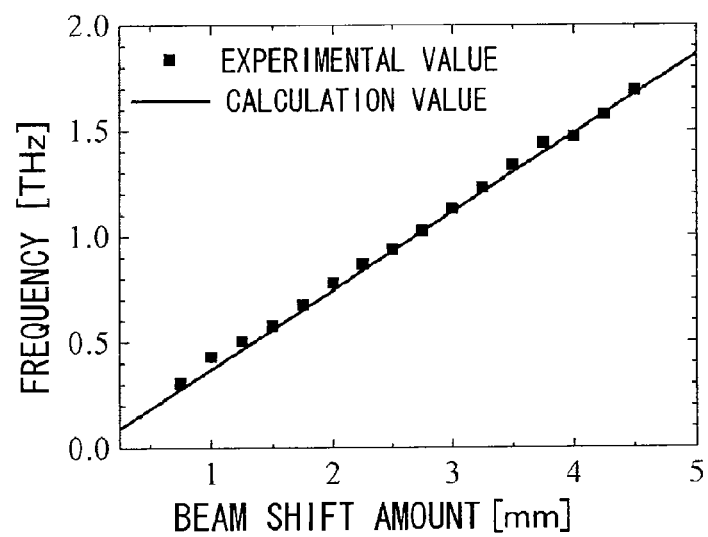
FIG. 7B is a diagram showing a relation between the beam shift amount and the terahertz wave frequency.

FIG. 7A shows a spectrum of the terahertz wave 6 with respect to a shift amount of the second laser beam 1b. The shift amount is based on a fixed position of the first laser beam 1a. Frequency tuning from 0.31 THz to 1.69 THz is confirmed, where maximum intensity is obtained at 0.68 THz. FIG. 7B shows a correspondence between the beam shift amount and the center frequency obtained from this measurement result. A calculation value indicated by the solid line is derived from wavelength and frequency components of the first laser beam 1a and the second laser beam 1b shown in FIG. 5A. The experimental result shows a value close to the calculation value, demonstrating the principle of the present invention described above.

(Comparison between the Present Invention and Conventional Techniques)

A most significant feature of the present invention is that the terahertz wave 6 of a single frequency is generated by excitation with broadband laser light. In a conventional difference frequency generation method called a photomixer, a laser of continuous light with an extremely narrow band is employed. This, however, causes a decrease in laser intensity, and so there is a disadvantage that the terahertz wave 6 of sufficient intensity cannot be obtained. Moreover, though a method of directly focusing light of a broadband femtosecond laser on a photoconductive element is widely used, a band of the generated terahertz wave 6 also becomes wider such as about 1 THz in this case, so that the waveform itself needs to be sampled for use as a spectroscopic device.

In the present invention, on the other hand, there is no need to limit the wavelength of broadband laser light, and the terahertz wave 6 having the same frequency can be generated using approximately all wavelength components. Thus, the present invention provides a more efficient generation technique with a high laser light utilization rate. Moreover, the frequency of the terahertz wave 6 is tuned merely by spatially shifting one of the laser beams (the second laser beam 1b). Since there is no need to control the laser body to change the light wavelength as in conventional techniques, tuning can be performed faster and more stably. In addition, the linewidth of the terahertz wave 6 can be expected to be narrowed more by further enhancing a wavelength resolution of the frequency gradient generation unit 11 such as a diffraction grating for forming the gradient laser beam shown in FIG. 3. Therefore, the present invention is sufficiently usable as a terahertz wave generating apparatus for spectrometry.

(Application Example of the Present Invention)

Figure 8:
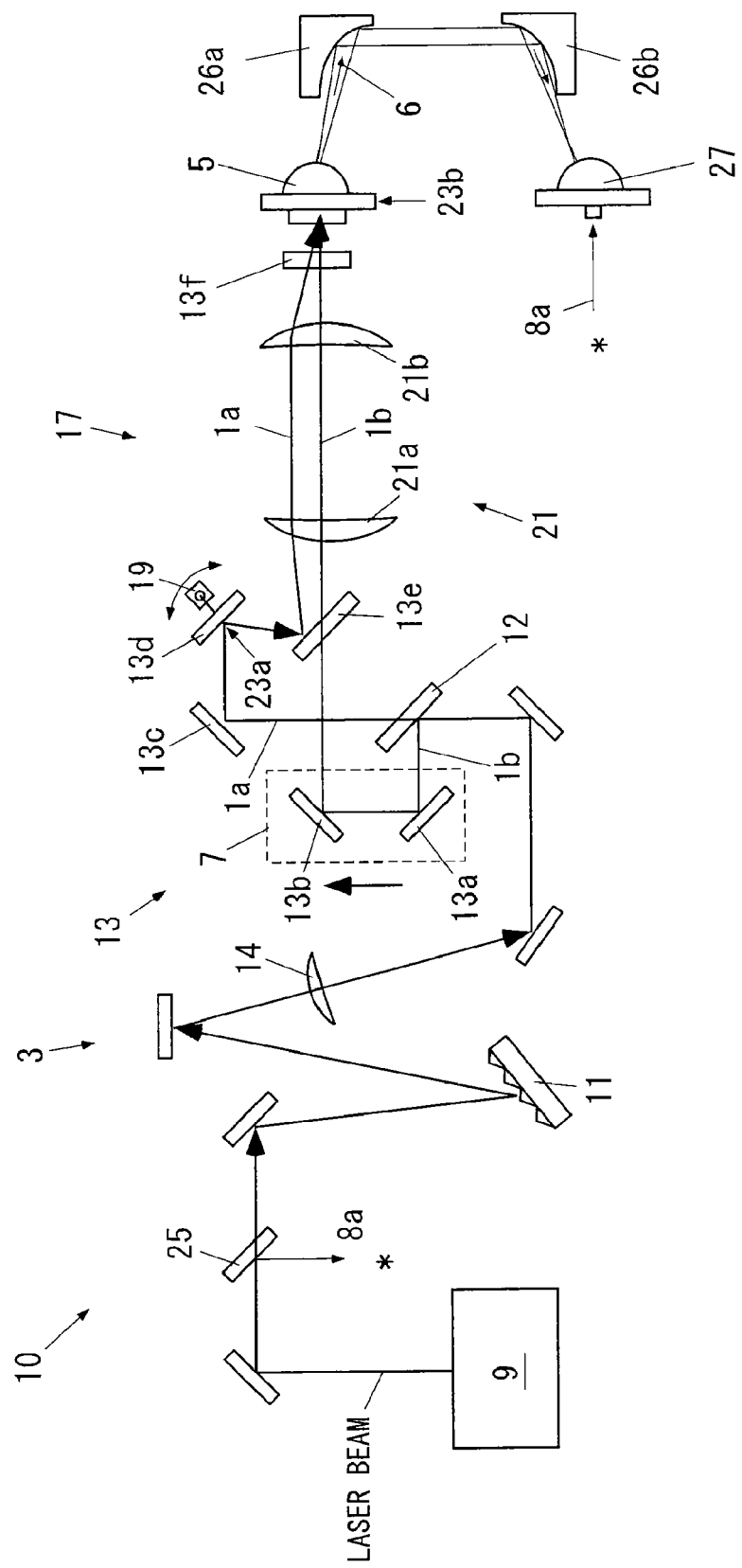
FIG. 8 is a diagram showing an application example of the present invention.

FIG. 8 is a diagram showing an application example of the present invention described above. As shown in FIG. 8, the terahertz wave generating apparatus 10 includes a beam scanning apparatus 17.

A scanning principle of the beam scanning apparatus 17 is described below.

FIGS. 9A to 9C are diagrams showing the scanning principle of the terahertz wave. FIGS. 9A to 9C respectively show situations where the terahertz wave 6 is directed to the left, the front, and the right.

In these drawings, reference numeral 2a is a wave front of the first laser beam 1a, 2b is a wave front of the second laser beam 1b, 6a is a wave front of the terahertz wave 6, $\theta_i$ is a relative incident angle between the first laser beam 1a and the second laser beam 1b to the difference frequency mixing unit 5 (an incident angle of the first laser beam 1a in this example), and $\theta_T$ is a radiation angle of the terahertz wave 6.

When the incident angle of the first laser beam 1a as one of the laser beams is slightly tilted, a phase difference 4 between the first laser beam 1a and the second laser beam 1b as the other laser beam linearly changes depending on position, as shown in FIGS. 9A and 9C. An electromagnetic wave generated from the first laser beam 1a and the second laser beam 1b at this time is expressed by Equation (1) of Formula 1, based on second-order nonlinear optical effects.

[Formula 1]

$$(E_1 + E_2)^2 = \{|E_1|\cos\omega_1 t + |E_2|\cos(\omega_2 t + \Delta\phi)\}^2 \quad (1)$$
$$= \frac{1}{2}(|E_1|^2 + |E_2|^2) +$$
$$\left\{\frac{1}{2}|E_1|^2\cos 2\omega_1 t + \frac{1}{2}|E_2|^2\cos(2\omega_2 t + \Delta\phi)\right\} +$$
$$\frac{|E_1||E_2|}{2}\cos\{(\omega_1 + \omega_2)t + \Delta\phi\} +$$
$$\frac{|E_1||E_2|}{2}\cos\{(\omega_1 - \omega_2)t - \Delta\phi\}$$

Here, $E_1$ and $E_2$ respectively denote electric fields of the first laser beam 1a and the second laser beam 1b, $|E_1|$ and $|E_2|$ respectively denote amplitudes of the first laser beam 1a and the second laser beam 1b, $\omega_1$ and $\omega_2$ respectively denote angular frequencies of the first laser beam 1a and the second laser beam 1b, t denotes a time, and $\Delta\phi$ denotes a phase difference between the first laser beam 1a and the second laser beam 1b. As can be understood based on the angular frequencies included in each term, the terms in Equation (1) represent signals of a direct current component, a second harmonic component, a sum frequency component, and a difference frequency component, respectively. Since the terahertz wave 6 is generated by difference frequency mixing in this example, the expression of the fourth term is rewritten as shown by Equation (2) of Formula 2.

Here, $\omega_T$ is an angular frequency of the terahertz wave 6, where Equation (2a) $\omega_1 - \omega_2 = \omega_T$ is satisfied.

Equation (2) indicates that a phase of the generated terahertz wave 6 is equal to the phase difference between the first laser beam 1a and the second laser beam 1b. Accordingly, as shown in FIGS. 9A and 9C, when tilting an incident direction of the first laser beam 1a as one of the laser beams, the phase of the terahertz wave 6 generated from each position also changes, and the wave front 6a of the terahertz wave 6 radiated from the whole element is tilted. This tilts a traveling direction of the terahertz wave 6. Hence, the terahertz wave 6 can be scanned (moved from side to side in the drawing) by controlling the incident angle $\theta_i$ of the first laser beam 1a as one of the laser beams.

Moreover, a most significant feature of the beam scanning apparatus 17 is a magnitude of a scanning angle of the terahertz wave 6.

In FIG. 9A, the phase difference between the first laser beam 1a and the second laser beam 1b caused by tilting the incidence of the first laser beam 1a to the left is expressed by Equation (3) of Formula 2.

Here, $k_i$ is a wave number of the laser beam, and x is a position on the element. Likewise, a phase distribution of the terahertz wave 6 generated from the whole element is expressed by Equation (4) of Formula 2.

Here, $k_T$ is a wave number of the terahertz wave 6. From the phase relation described in Equations (1) and (2), Equation (2b) $\phi_T(x) = \Delta\phi_i(x)$ holds. By combining this and Equations (3) and (4), a relation expressed by Equation (5) of Formula 2 is derived.

[Formula 2]

$$E_T = \frac{|E_1||E_2|}{2}\cos(\omega_T t - \Delta\phi) \quad (2)$$

$$\Delta\phi_i(x) = k_i x \sin\theta_i \quad (3)$$

$$\phi_T(x) = k_T x \sin\theta_T \quad (4)$$

$$\sin\theta_T = \frac{k_i}{k_T}\sin\theta_i \quad (5)$$

Typically, an infrared laser is used for generating the terahertz wave 6, and the wavelength of the terahertz wave 6 is several hundred times longer than that of infrared radiation. That is, the value of $k_i/k_T$ in Equation (5) is very large. Therefore, merely by slightly changing the relative incident angle between the first laser beam 1a and the second laser beam 1b (i.e. the incident angle $\theta_1$ of the first laser beam 1a) to the terahertz generator, the terahertz wave 6 is scanned with the radiation angle $\theta_T$ several hundred times wider than the incident angle.

Figure 10:
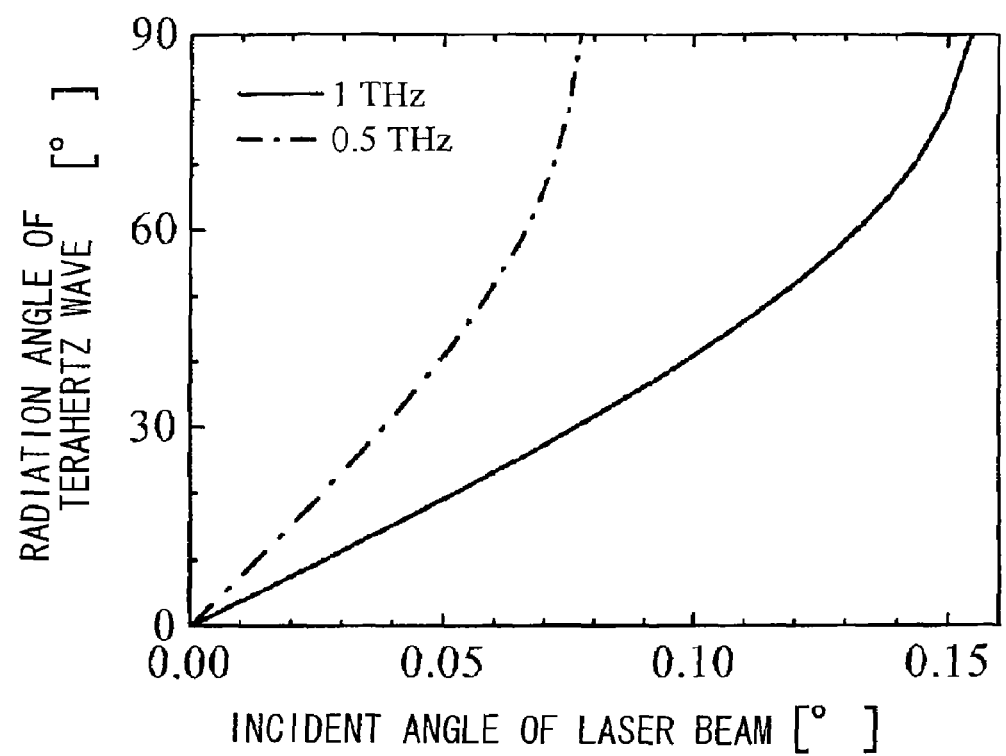
FIG. 10 is a diagram showing a relation between an incident angle $\theta_i$ of a first laser beam and a radiation angle $\theta_T$ of a terahertz wave.

FIG. 10 is a diagram showing a relation between the incident angle $\theta_i$ of the first laser beam 1a and the radiation angle $\theta_T$ of the terahertz wave 6.

As shown in the drawing, for example, when the incident angle $\theta_i$ of the first laser beam 1a is changed by ±0.1°, a scanning range (radiation angle) of the terahertz wave 6 reaches ±40° in the case of 1 THz, allowing for wide-angle beam scanning.

The beam scanning apparatus 17 described above includes a laser beam deflection device 19 and a confocal lens system 21, as shown in FIG. 8.

The laser beam deflection device 19 changes the incident angle $\theta_i$ of the first laser beam 1a, by rotating the fourth reflection mirror 13d. Alternatively, the laser beam deflection device 19 may be a device (e.g. an electro-optic deflector, an acousto-optic deflector) that is disposed between the fourth reflection mirror 13d and the beam splitter 13e and the like and changes the traveling direction of the first laser beam 1a.

The confocal lens system 21 is located between a common focal point 23b and a first focal point 23a upstream of the common focal point 23b, and focuses the first laser beam 1a passing through the first focal point 23a, on the common focal point 23b. In this example, the confocal lens system 21 is composed of two convex lenses 21a and 21b (or a convex lens group). The convex lenses 21a and 21b respectively have focal lengths $F_1$ and $F_2$, and a distance between the convex lenses 21a and 21b is set to $F_1+F_2$. The focal lengths $F_1$ and $F_2$ are preferably equal to each other, though they may be different.

According to the structure shown in FIG. 8, in addition to the above-mentioned effects of the terahertz wave apparatus, rotating the fourth reflection mirror 13d by a certain angle enables the radiation direction of the terahertz wave 6 to be changed by an angle several hundred times the rotation angle.

Note that a beam separation element 25 extracts a part of the laser light as probe light 8a. Reference numerals 26a and 26b are parabolic mirrors, and 27 is a dipole antenna.

It is to be noted that the present invention is not limited to the embodiment described above, and various modifications can be made without departing from the scope of the present invention.

(1) The present invention is applicable to beam scanning of not only terahertz waves but also millimeter waves (30 GHz to 300 GHz).

(2) Examples of the nonlinear optical element include a nonlinear optical crystal and a photoconductive element.

(3) The nonlinear optical element generating a terahertz wave may be an array structure.

(4) The number of elements in the case of the array structure may be any number equal to or more than 2.

(5) A band of laser light is visible light or infrared radiation.

(6) Examples of the laser beam deflection device include an electro-optic deflector, an acousto-optic deflector, and a rotation mirror.

(7) A reflection mirror may be used instead of a lens.

(8) Terahertz wave scanning in a two-dimensional direction is also possible.

The invention claimed is:

1. A terahertz wave generating method comprising the steps of:
   (a) providing a first laser beam and a second laser beam incident on a difference frequency mixing unit and overlapping the two laser beams in the difference frequency mixing unit, and
   (b) generating a terahertz wave whose frequency is a frequency difference between the two laser beams,
   wherein the first laser beam has a spatial spread in a predetermined direction and a spatial frequency distribution of the first laser beam is a distribution in which a magnitude of a frequency gradually increases in a frequency gradient direction which is the predetermined direction, the second laser beam also has a spatial spread in the frequency gradient direction and a spatial frequency distribution of the second laser beam is also a distribution in which a magnitude of a frequency gradually increases in the frequency gradient direction so that the frequency difference between the two laser beams is equal in each position in an overlapping region of the two laser beams, and the terahertz wave of a single frequency is generated from the overlapping region, and
   wherein the first laser beam and the second laser beam are spatially shifted with respect to each other in the frequency gradient direction to change the frequency difference in the overlapping region, thereby changing the single frequency.

2. A terahertz wave generating apparatus that generates, from a first laser beam and a second laser beam, a terahertz wave whose frequency is a frequency difference between the two laser beams, wherein the terahertz wave generating apparatus comprises:
   (a) a laser generation and guidance device;
   (b) difference frequency mixing unit,
   wherein the laser generation and guidance device generates the first laser beam and the second laser beam, and guides the first laser beam and the second laser beam to the difference frequency mixing unit so as to overlap with each other,
   wherein the difference frequency mixing unit generates, in an overlapping region of the incident first laser beam and second laser beam, the terahertz wave whose frequency is the frequency difference between the two laser beams,
   wherein the first laser beam has a spatial spread in a predetermined direction and a spatial frequency distribution of the first laser beam is a distribution in which a magnitude of a frequency gradually increases in a frequency gradient direction which is the predetermined direction, the second laser beam also has a spatial spread in the frequency gradient direction and a spatial frequency distribution of the second laser beam is also a distribution in which a magnitude of a frequency gradually increases in the frequency gradient direction so that the frequency difference between the two laser beams is equal in each position in the overlapping region, and the terahertz wave of a single frequency is generated from the overlapping region; and
   (c) a shift device that spatially shifts the first laser beam and the second laser beam with respect to each other in the frequency gradient direction, and
   wherein the frequency difference in the overlapping region is changed by the shifting, so that the single frequency is variable.

3. The terahertz wave generating apparatus according to claim 2, wherein the laser generation and guidance device includes:
   a band laser generation unit that generates laser light having a predetermined frequency band;
   a frequency gradient generation unit that has the laser light incident thereon, and generates a gradient laser beam having a spatial spread and also having the frequency distribution;
   a beam separation unit that separates the gradient laser beam into the first laser beam and the second laser beam; and
   a guide optical unit that guides the first laser beam and the second laser beam to the difference frequency mixing unit.

4. The terahertz wave generating apparatus according to claim 3, wherein the guide optical unit is disposed between the beam separation unit and the difference frequency mixing unit in an optical path, and has a reflection mirror for reflecting the second laser beam from the beam separation unit, and
   wherein the shift device moves the reflection mirror to change a position of incidence of the reflected second laser beam on the difference frequency mixing unit.

* * * * *